(12) United States Patent
Buchmüller

(10) Patent No.: US 12,716,513 B2
(45) Date of Patent: Aug. 25, 2026

(54) VALVE WITH VALVE UNIT AND PUSHBUTTON HOUSING WITH ACTUATING BUTTON

(71) Applicant: Grohe AG, Hemer (DE)

(72) Inventor: Janik Buchmüller, Dortmund (DE)

(73) Assignee: Grohe AG, Hemer (DE)

( * ) Notice: Subject to any disclaimer, the term of this patent is extended or adjusted under 35 U.S.C. 154(b) by 13 days.

(21) Appl. No.: 19/099,268

(22) PCT Filed: Oct. 5, 2023

(86) PCT No.: PCT/EP2023/077561
§ 371 (c)(1),
(2) Date: Jan. 28, 2025

(87) PCT Pub. No.: WO2024/074610
PCT Pub. Date: Apr. 11, 2024

(65) Prior Publication Data

US 2026/0036218 A1 Feb. 5, 2026

(30) Foreign Application Priority Data

Oct. 5, 2022 (DE) ......................... 102022125635.9

(51) Int. Cl.
*F16K 31/00* (2006.01)
*E03C 1/02* (2006.01)
(Continued)

(52) U.S. Cl.
CPC .............. *F16K 31/003* (2013.01); *E03C 1/04* (2013.01); *F16K 31/084* (2013.01); *E03C 2001/026* (2013.01); *Y10T 137/9464* (2015.04)

(58) Field of Classification Search
CPC ............. Y10T 137/9464; F16K 31/003; F16K 31/084; F16K 31/06; F16K 31/52491;
(Continued)

(56) References Cited

U.S. PATENT DOCUMENTS 5,427,351 A * 6/1995 Korfgen .................. F16K 21/10 251/35
7,296,593 B2 * 11/2007 Matsui .................... F16K 21/12 251/38
(Continued)

FOREIGN PATENT DOCUMENTS

DE 102017105200 A1 9/2018
DE 102019103609 A1 8/2020
EP 1903267 A1 3/2008

OTHER PUBLICATIONS

PCT International Search Report and Written Opinion for PCT/EP2023/077561, mail date Dec. 15, 2023 (11 pages).

*Primary Examiner* — Jessica Cahill
(74) *Attorney, Agent, or Firm* — Anna-lisa L. Gallo; Tyler A. Stevenson

(57) ABSTRACT

The invention relates to a valve (1) for a sanitary fitting, at least comprising:

a valve unit (2) with a valve housing (3) and with an inflow connection (4) and an outflow connection (5) for transferring the fluid supplied via the inflow connection (4), wherein the inflow connection (4) and the outflow connection (5) are switchably connectable to each other by the valve unit (2), wherein the inflow connection (4) and the outflow connection (5) are fluidically separated from each other in a first position of the valve unit (2) and are connected to each other in a second position; and a pushbutton housing (6) which is connected to the valve housing (3) and has an actuating button (7) for switching the valve unit (2), wherein the actuating button (7) is held in a starting position (8) by a first holding mechanism (9);

wherein, starting from the starting position (8), a second holding mechanism (12) of the valve unit (2) can be actuated (Continued)

by shifting of the actuating button (7) by a first distance (11) along an axial first direction (10).

12 Claims, 1 Drawing Sheet

(51) Int. Cl.
*E03C 1/04* (2006.01)
*F16K 31/08* (2006.01)

(58) Field of Classification Search
CPC .......... F16K 31/56; E03C 1/0403; E03C 1/04; E03C 2001/026
See application file for complete search history.

(56) References Cited

U.S. PATENT DOCUMENTS

| | | | | |
|---|---|---|---|---|
| 11,454,333 | B2 * | 9/2022 | Pávics | F16K 11/0743 |
| 11,739,858 | B2 * | 8/2023 | Tempel | F16K 31/52408<br>251/28 |
| 2009/0146090 | A1 * | 6/2009 | Hashimoto | G05D 7/03<br>251/25 |
| 2017/0343127 | A1 * | 11/2017 | Bian | F16K 31/3855 |

* cited by examiner

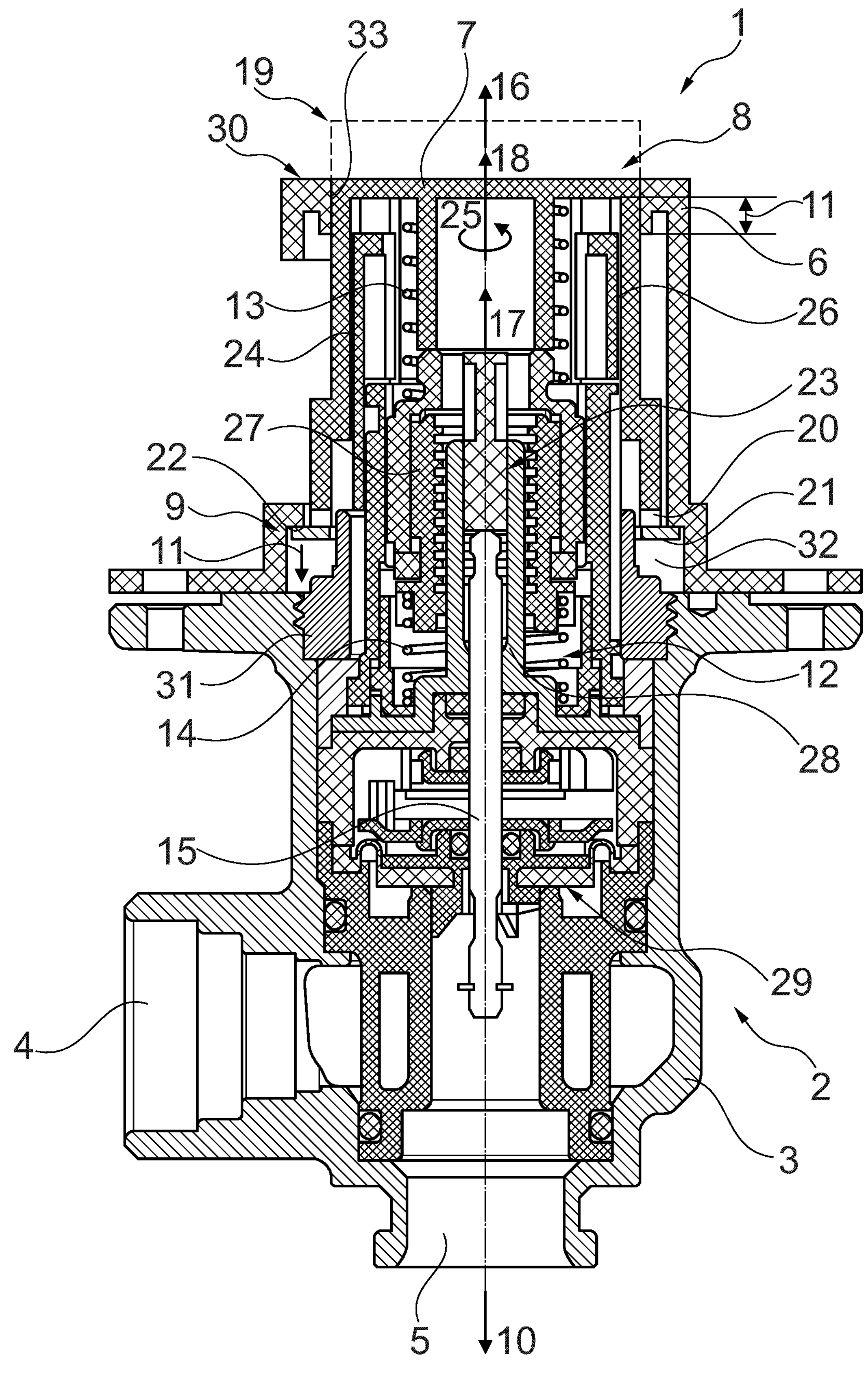
1
2
3
4
5
6
7
8
9
10
11
11
12
13
14
15
16
17
18
19
20
21
22
23
24
25
26
27
28
29
30
31
32
33

VALVE WITH VALVE UNIT AND PUSHBUTTON HOUSING WITH ACTUATING BUTTON

The present invention relates to a valve of a sanitary fitting. Such sanitary fittings are used for adequately providing a liquid, for example for showers, bathtubs, sinks or washbasins.

With a (control) valve, the liquid can be supplied, for example, to different jet formers of the sanitary fitting, for example a shower head of a shower. By means of the jet formers, the liquid can be dispensed through the sanitary fitting with different types of jets, for example full jets, rain jets, massage jets, etc. Furthermore, the liquid can also be supplied to different liquid outlets of a sanitary fitting by means of the valve. For example, the liquid can be supplied in a targeted manner through the valve to a bath tub spout and/or a hand shower.

A valve that can be used to adjust only a volume flow and that can be opened and closed at the push of a button is known, for example, from EP 1 903 267 A1.

Valves are known in which the volume flow can be switched on and off at the push of a button and, furthermore, can be adjusted using the actuating button. In doing so, the actuating button for adjusting the volume flow needs to turned. Often, the stroke of the actuating button between the starting position (valve closed) and an actuating position (valve open) is only short, so that an accessible length of the actuating button is insufficient for proper operation by a user.

It is therefore the object of the invention to at least partially solve the problems described with respect to the prior art and, in particular, to provide a valve in which a sufficient length is accessible to a user for adjusting a volume flow.

These objects are achieved by means of a valve according to the features of the independent patent claim. Further advantageous configurations of the valve are indicated in the dependent patent claims. It should be noted that the features individually listed in the dependent patent claims can be combined with each other in any technologically meaningful way and define further embodiments of the invention. Moreover, the features indicated in the patent claims are specified and explained in more detail in the description, in which further preferred embodiments of the invention are presented.

A valve for a sanitary fitting is proposed, comprising at least:

- a valve unit with a valve housing and with an inflow connection and an outflow connection for transferring the fluid supplied via the inflow connection, wherein the inflow connection and the outflow connection are switchably connectable to each other by the valve unit, wherein the inflow connection and the outflow connection are fluidically separated from each other in a first position of the valve unit and are connected to each other in a second position; and
- a pushbutton housing which is connected to the valve housing and has an actuating button for switching the valve unit, wherein the actuating button is held in a starting position (of the valve or of the pushbutton housing) by a first holding mechanism.

Starting from this starting position, a second holding mechanism of the valve unit, by means of which the valve unit can be switched between the first position and the second position, can be actuated by shifting of the actuating button by a first distance along an axial first direction. The first holding mechanism has a first spring and the second holding mechanism has a second spring, which are each preloaded in the starting position and in the first position with respect to the axial direction. By actuating the second holding mechanism, the second spring is (will be) at least partially relaxed and thus shifts at least part of the valve unit by a second distance along an axial second direction, thereby switching the valve unit. Due to the relaxing of the second spring, the first holding mechanism can be actuated and the first spring thus relaxes at least partially and thus shifts the actuating button by a third distance along the axial second direction towards an actuating position.

Thus, in addition to the (second) holding mechanism of the valve unit that is usually present, a further (first) holding mechanism is proposed. These holding mechanisms each have a spring that is preloaded in a starting position of the valve. When actuating the actuating button, the springs are at least partially relaxed, wherein the actuating button is (initially) shifted by the second spring along the second axial direction and (then or then also) by the first spring. The additional first spring allows the actuating button to be shifted as far as necessary, (relatively) independently of the required stroke of the valve unit, so that a sufficient length of the actuating button accessible to a user can be provided for adjusting a volume flow and/or for controlling a temperature.

The valve is arranged, for example, in a sanitary fitting or can be connected to a sanitary fitting via hose lines and/or pipes. Sanitary fittings are used to adequately provide a liquid, in particular water, for example for showers, bathtubs, sinks or washbasins. In particular, the valve can be arranged at least partially concealed or at least partially in a wall or a support.

The valve (or the valve unit) comprises a valve housing with at least one inlet (inflow connection) via which the valve can be connected to a liquid source, for example a public liquid supply network. A mixing valve or a mixing cartridge with which a cold water with a cold water temperature and a hot water with a hot water temperature can be mixed to form a mixed water with a desired mixed water temperature can be connected upstream of the at least one inlet. In particular, the cold water temperature is a maximum of 25° C. (Celsius), preferably 1° C. to 25° C., particularly preferably 5° C. to 20° C., and/or the hot water temperature is in particular a maximum of 90° C., preferably 25° C. to 90° C., particularly preferably 55° C. to 65° C. The valve housing can be designed in multiple parts. Furthermore, the valve housing can consist at least partially of plastic and/or metal, such as brass, for example.

In particular, the third distance is greater than the second distance and/or the second distance is greater than the first distance.

The first distance indicates in particular the shifting of the actuating button along the axial first direction. Only after this first distance is reached or overcome, the second holding mechanism is triggered or opened (automatically or immediately). This holding mechanism is designed in a manner known per se, wherein the shifting along the first direction also causes a part of the second holding mechanism to turn, and as a result of this turning, a locking of the second holding mechanism is released and the second spring relaxes at least partially. When the second spring is released, parts of the valve unit and the actuating button are moved in the axial second direction (opposite to the first direction).

During the shifting of the actuating button in the first direction, the first spring is in particular further preloaded.

In particular, the second spring causes the parts of the valve unit and the actuating button to be shifted by the second distance along the axial second direction. In particular, the second distance is greater than the first distance, so that the first holding mechanism (thus, after covering the first distance, which is smaller than the second distance) can be actuated by a joint spring force of the (no longer locked) second spring and the first spring. Subsequent to the second distance, in particular "at least" or even preferably "only" the actuating button is shifted along the second direction. This shifting by the third distance is carried out in particular exclusively by the first spring force.

In particular, in the actuating position, the actuating button is shifted with respect to the starting position by at least 10 millimeters, preferably by at least 12, particularly preferably by at least 14 millimeters or even by 15 millimeters, along the axial second direction.

In particular, the first distance is about 5 millimeters, the second distance is about 7 millimeters, and the third distance is about 8 millimeters.

In particular, starting from the actuating position, the actuating button can be shifted at least by the third distance and by the second distance along the first axial direction, thereby preloading the first spring and the second spring and also transferring the valve unit into the first position.

In particular, the first holding mechanism comprises a magnet and a metal disk, wherein a magnetic force between the magnet and the metal disk is greater than the preload of the first spring (present in the starting position).

In particular, the magnet is secured to the actuating button. Alternatively, however, the metal disk can also be secured to the actuating button.

In particular, a sum of the preloads of the first spring and the second spring (in particular after covering the first distance when shifting back along the second direction) is greater than the magnetic force.

In particular, the magnet is connected to the actuating button and the metal disk is accommodated in the pushbutton housing such that it is positively locked by means of a stop, at least with respect to the second axial direction, but can be shifted along the axial direction. In the starting position, the metal disk comes into contact with the magnet. The metal disk can be shifted by the actuating button (starting from the stop) along the axial first direction, wherein when actuating the second holding mechanism, the actuating button and thus also the metal disk can be shifted by the relaxing of the second spring along the axial second direction. In this case, the metal disk can be retained by the stop or is retained by the stop, so that the connection between the magnet and the metal disk is released and the actuating button can be shifted further along the axial second direction.

The stop is arranged in particular on the pushbutton housing. In particular, the stop delimits an (annular) chamber with respect to the second axial direction, wherein the metal plate can be shifted within the chamber along the axial direction. In the starting position, the preloaded first spring pushes the actuating button in the direction of the second direction. The actuating button, which is connected to the metal plate via the magnet, is thus held in the starting position by the stop.

In particular, the magnet and metal plate can also be arranged in reverse, i.e. the magnet as a shiftable plate in the chamber and the metal plate connected to the actuating button.

In particular, starting from the actuating position, the actuating button can be shifted at least by the third distance and by the second distance along the first axial direction, thereby preloading the first spring and the second spring and transferring the valve unit (back) into the first position. In the process of this (after covering the second and third distances), the magnet comes into contact with the metal disk. After the actuating button has then been shifted back by the first distance, the metal disk can be retained by the stop, or the metal disk (and thus the actuating button) is retained by the stop.

In particular, the valve has a volume flow control unit for adjusting a volume flow of the fluid in the second position (thus, when the valve is arranged in the second position). The volume flow control unit has a turnable operating element that is connected to the actuating button via a connection that is positively locking with respect to a circumferential direction. The operating element is connected to the valve unit via a threaded sleeve, so that by turning the operating element, an actuating element of the valve unit can be shifted along the axial direction in order to change a flow cross-section between the inflow connection and the outflow connection (in particular in the manner of a screw drive).

In particular, the pushbutton housing has an opening at one end, through which opening the actuating button can be actuated. In the starting position, the actuating button is flush with the end and, in the actuating position, it projects at least 10 millimeters, preferably at least 12 millimeters, particularly preferably at least 14 millimeters or even 15 millimeters, beyond the end along the axial direction.

This projection ensures a sufficient length accessible to a user in order to adjust or control a volume flow via the actuating button.

The pushbutton housing can be connected to the valve housing by means of a thread.

According to another aspect, a sanitary fitting comprising a valve as presented here is proposed. This also applies to a set consisting of a sanitary fitting and a valve.

As a precaution, it should be noted that the number words used here ("first", "second", . . . ) primarily serve to distinguish between several similar objects, sizes or processes, and in particular do not necessarily imply any dependency and/or sequence of these objects, sizes or processes in relation to one another. Should a dependency and/or sequence be necessary, this is explicitly stated here or it is obvious to the person skilled in the art when studying the specifically described configuration. Insofar as a component may occur multiple times ("at least one"), the description of one of these components can apply equally to all or some of the plurality of these components, but this is not mandatory.

The invention as well as the technical environment will be explained in more detail below with reference to the accompanying FIGURE. It is to be noted that the invention is not intended to be limited by the cited exemplary embodiment. In particular, unless explicitly stated otherwise, it is also possible to extract partial aspects of the facts explained in the FIGURE and to combine them with other components and findings from the present description. In particular, it should be noted that the FIGURE and in particular the proportions shown are only schematic.

FIG. 1 shows a valve 1 with a volume flow control unit 23 and an actuating button 7, in a longitudinal section.

The valve 1 comprises a valve unit 2 with a valve housing 3 and with an inflow connection 4 and an outflow connection 5 for transferring the fluid supplied via the inflow connection 4, wherein the inflow connection 4 and the outflow connection 5 are switchably connectable to each other by the valve unit 2, wherein the inflow connection 4 and the outflow connection 5 are fluidically separated from each other in the illustrated first position of the valve unit 2 and are connected to each other in a second position (not illustrated here). The valve 1 further comprises a pushbutton housing 6 which is connected to the valve housing 2 and has an actuating button 7 for switching the valve unit 2, wherein the actuating button 7 is held in a starting position 8 (of the valve 1 or the pushbutton housing 6) by a first holding mechanism 9. The pushbutton housing 6 is connected to the valve housing 3 via a thread 31.

Starting from the starting position 8 (actuating button 7 is arranged flush with the end 30 of the pushbutton housing 6), by shifting the actuating button 7 by a first distance 11 along an axial first direction 10, a second holding mechanism 12 of the valve unit 2 can be actuated, by means of which the valve unit 2 can be switched between the first position and the second position. The first holding mechanism 9 has a first spring 13 and the second holding mechanism 12 has a second spring 14 which are preloaded in the starting position 8 and in the first position in each case with respect the axial direction 10, 16. By actuating the second holding mechanism 12, the second spring 14 relaxes at least partially and thereby shifts at least a part 15 of the valve unit 2 by a second distance 17 along an axial second direction 16 and thus switches the valve unit 2. Due to the relaxing of the second spring 14, the first holding mechanism 9 can be actuated and the first spring 13 thus relaxes at least partially and thus shifts the actuating button 7 by a third distance 18 along the axial second direction 16 to an actuating position 19 (indicated in FIG. 1, actuating button 7 has a projection relative to the end 30).

Thus, in addition to the (second) holding mechanism 12 of the valve unit 2, which is usually present, a further (first) holding mechanism 9 is proposed. These holding mechanisms 9, 12 each have a spring 13, 14, which are preloaded in a starting position 8 of the valve 1. When the actuating button 7 is pressed, the springs 13, 14 are at least partially relaxed, whereby the actuating button 7 is shifted along the second axial direction 16 (initially) by the second spring 14 and (then or then also) by the first spring 13. The additional first spring 13 allows the actuating button 7 to be shifted as far as necessary (relatively) independent of the required stroke of the valve unit 2, so that a sufficient length of the actuating button 7 accessible to a user (the projection) can be provided for adjusting a volume flow and/or for controlling a temperature.

The first distance 11 denotes the shifting of the actuating button 7 along the axial first direction 10. This first distance 11 is required in order to release the second holding mechanism 12. The latter is designed in a known manner, wherein the shifting along the first direction 10 also causes a turning of a part of the second holding mechanism 12, wherein, as a result of this turning, a locking of the second holding mechanism 12 is released and the second spring 14 is at least partially relaxed. When the second spring 14 relaxes, parts 15 of the valve unit 2 and the actuating button 7 are moved along the axial second direction 16 (opposite to the first direction 10).

During the shifting of the actuating button 7 along the first direction 10, the first spring 13 is further preloaded.

By means of the second spring 14, the parts 15 of the valve unit 2 and the actuating button 7 are shifted by the second distance 17 along the axial second direction 16. The second distance 17 is greater than the first distance 11 so that the first holding mechanism 9 can be actuated by a joint spring force of the (no longer locked) second spring 14 and the first spring 13. Following the second distance 17, only the actuating button 7 is shifted further along the second direction 16. This shifting by the third distance 18 is effected exclusively by the spring force of the first spring 13.

In the actuating position 19, the actuating button 7 is shifted by approximately 15 millimeters along the axial second direction 16 compared to the starting position 8.

Starting from the actuating position 19, the actuating button 7 can be shifted by at least the third distance 18 and by the second distance 17 along the axial first direction 10, thereby preloading the first spring 13 and the second spring 14 and transferring the valve unit 2 into the first position.

The first holding mechanism 9 comprises a magnet 20 and a metal disk 21, wherein a magnetic force between the magnet 20 and the metal disk 21 is greater than the preload of the first spring 13 present in the starting position 8. The magnet 20 is secured to the actuating button 7.

A sum of the preloads of the first spring 13 and the second spring 14, thus after actuation of the second holding mechanism 12 and after covering the first distance 11 along the axial second direction 16, thus, when the magnet 20 comes into contact with the stop 22, is greater than the magnetic force.

The magnet 20 is connected to the actuating button 7, and the metal disk 21 is accommodated in the pushbutton housing 6 such that it is positively locked with respect to the second axial direction 16 by means of a stop 22, but (starting from the stop 22) can be shifted along the axial first direction 10. In the starting position 8, the metal disk 21 comes into contact with the magnet 20 and the stop 22. The metal disk 21 can be shifted along the axial first direction 10 by the actuating button 7 (starting from the stop 22), wherein, when the second holding mechanism 12 is actuated, the actuating button 7 and thus also the metal disk 21 can be shifted (back) along the axial second direction 16 by the relaxation of the second spring 14. In doing so, the metal disk 21 can be held back by the stop 22 or is held back by the stop 22 so that as a result, the connection between the magnet 20 and the metal disk 21 is released and the actuating button 7 can be shifted further along the axial second direction 16.

The stop 22 is arranged on the pushbutton housing 6. The stop 22 delimits an (annular) chamber 32 with respect to the second axial direction 16, wherein the metal plate 21 can be shifted within the chamber 32 along the axial direction 10, 16. In the starting position 8, the preloaded first spring 13 presses the actuating button 7 in the direction of the second direction 16. The actuating button 7, which is connected to the metal plate 21 via the magnet 20, is thus held in the starting position 8 by the stop 22.

Starting from the actuating position 19, the actuating button 7 can be shifted by the third distance 18 and by the second distance 17 along the axial first direction 10 thereby preloading the first spring 13 and the second spring 14 and transferring the valve unit 2 (back) to the first position. In doing so (after covering the second and third distances 17, 18), the magnet 20 comes into contact with the metal disk 21. After the actuating button 7 is then shifted back by the first distance 11, the metal disk 21 can be held back by the stop 22 or the metal disk 21 (and thus the actuating button 7) is held back by the stop 22. The second retaining mechanism 12 is thereby locked again in a known manner.

The valve 1 has a volume flow control unit 23 for adjusting a volume flow of the fluid in the second position (thus, when the valve 1 is arranged in the second position). The volume flow control unit 23 has a turnable operating element 24, which is connected to the actuating button 7 via a positive connection 26 with respect to a circumferential direction 25. The operating element 24 is connected to the valve unit 2 via a threaded sleeve 27 so that by turning the operating element 24, an actuating element 28 of the valve unit 2 can be shifted along the axial direction 10, 16 in order to change a flow cross-section 29 between the inflow connection 4 and the outflow connection 5 (in particular in the manner of a screw drive).

The pushbutton housing 6 has an opening 33 at one end 30, through which opening the actuating button 7 can be actuated. In the starting position 8, the actuating button 7 is flush with the end 30 and, in the actuating position 19, it projects 15 millimeters beyond the end 30 along the axial direction 10, 16.

This projection ensures a sufficient length accessible to a user for adjusting or controlling a volume flow via the actuating button 7.

REFERENCE LIST

1 valve
2 valve unit
3 valve housing
4 inflow connection
5 outflow connection
6 pushbutton housing
7 actuating button
8 starting position
9 first holding mechanism
10 first direction
11 first distance
12 second holding mechanism
13 first spring
14 second spring
15 part
16 second direction
17 second distance
18 third distance
19 actuating position
20 magnet
21 metal disk
22 stop
23 volume flow control unit
24 operating element
25 circumferential direction
26 connection
27 threaded sleeve
28 actuating element
29 flow cross-section
30 end
31 thread
32 chamber

The invention claimed is:

1. A valve (1) for a sanitary fitting, comprising a valve unit (2) having a valve housing (3), an inflow connection (4), and an outflow connection (5) for transferring fluid supplied via the inflow connection (4), wherein the inflow connection (4) and the outflow connection (5) are switchably connectable to each other by the valve unit (2), wherein the inflow connection (4) and the outflow connection (5) are fluidically separated from each other in a first position of the valve unit (2) and are connected to each other in a second position; and a pushbutton housing (6) which is connected to the valve housing (3) and has an actuating button (7) for switching the valve unit (2), wherein the actuating button (7) is held in a starting position (8) by a first holding mechanism (9);

wherein, starting from the starting position (8), by shifting the actuating button (7) by a first distance (11) along an axial first direction (10), a second holding mechanism (12) of the valve unit (2) is configured to be actuated, such that the valve unit (2) is configured to be switched between the first position and the second position;

wherein the first holding mechanism (9) has a first spring (13) and the second holding mechanism (12) has a second spring (14) which are preloaded in the starting position (8) and in the first position in each case with respect to the axial direction (10); wherein by actuating the second holding mechanism (12), the second spring (14) relaxes at least partially and thereby shifts at least a part (15) of the valve unit (2) by a second distance (17) along an axial second direction (16) and thus switches the valve unit (2); wherein by the relaxing of the second spring (14), the first holding mechanism (9) is configured to be actuated and the first spring (13) thus relaxes at least partially and thus shifts the actuating button (7) by a third distance (18) along the axial second direction (16) towards an actuating position (19).

2. The valve (1) according to claim 1, wherein at least the third distance (18) is greater than the second distance (17), or the second distance (17) is greater than the first distance (11).

3. The valve (1) according to claim 1, wherein in the actuating position (19), the actuating button (7) is shifted with respect to the starting position (8) by at least 10 millimeters along the axial second direction (16).

4. The valve (1) according to claim 1, wherein, starting from the actuating position (19), the actuating button (7) is configured to be shifted by at least the third distance (18) and the second distance (17) along the first axial direction (10) and thereby preloads the first spring (13) and the second spring (14) and transfers the valve unit (2) into the first position.

5. The valve (1) according to claim 1, wherein the first holding mechanism (9) comprises a magnet (20) and a metal disk (21), wherein a magnetic force between the magnet (20) and the metal disk (21) is greater than the preload of the first spring (13).

6. The valve (1) according to claim 5, wherein a sum of the preloads of the first spring (13) and of the second spring (14) is greater than the magnetic force.

7. The valve (1) according to claim 6, wherein the magnet (20) is connected to the actuating button (7) and the metal disk (21) is accommodated in the pushbutton housing (6) such that it is positively locked by means of a stop (22), at least with respect to the second axial direction (16), but is configured to be shifted along the axial direction (10, 16); wherein, in the starting position (8), the metal disk (21) comes into contact with the magnet (20) and is configured to be shifted by the actuating button (7) along the axial first direction (10), wherein, when actuating the second holding mechanism (12), the actuating button (7) and thus also the metal disk (21) is configured to be shifted by the relaxing of the second spring (14) along the axial second direction (16), wherein, in doing so, the metal disk (21) is configured to be held back by the stop (22) and as a result, the connection between the magnet (20) and the metal disk (21) is released and the actuating button (7) is configured to be shifted further along the axial second direction (16).

8. The valve (1) according to claim 7, wherein, starting from the actuating position (19), the actuating button (7) is configured to be shifted at least by the third distance (18) and the first distance (11) along the axial first direction (10) and thereby preloads the first spring (13) and the second spring (14) and also transfers the valve unit (2) into the first position; wherein, in doing so, the magnet (20) comes into contact with the metal disk (21) and, after the actuating button (7) has been shifted back by the first distance (11), the metal disk (21) is configured to be held back by the stop (22).

9. The valve (1) according to claim 5, wherein the magnet (20) is connected to the actuating button (7) and the metal disk (21) is accommodated in the pushbutton housing (6) such that it is positively locked by means of a stop (22), at least with respect to the second axial direction (16), but is configured to be shifted along the axial direction (10, 16); wherein, in the starting position (8), the metal disk (21) comes into contact with the magnet (20) and is configured to be shifted by the actuating button (7) along the axial first direction (10), wherein, when actuating the second holding mechanism (12), the actuating button (7) and thus also the metal disk (21) is configured to be shifted by the relaxing of the second spring (14) along the axial second direction (16), wherein, in doing so, the metal disk (21) is configured to be held back by the stop (22) and as a result, the connection between the magnet (20) and the metal disk (21) is released and the actuating button (7) is configured to be shifted further along the axial second direction (16).

10. The valve (1) according to claim 9, wherein, starting from the actuating position (19), the actuating button (7) is configured to be shifted at least by the third distance (18) and the first distance (11) along the axial first direction (10) and thereby preloads the first spring (13) and the second spring (14) and also transfers the valve unit (2) into the first position; wherein, in doing so, the magnet (20) comes into contact with the metal disk (21) and, after the actuating button (7) has been shifted back by the first distance (11), the metal disk (21) is configured to be held back by the stop (22).

11. The valve (1) according to claim 1, wherein the valve (1) has a volume flow control unit (23) for adjusting a volume flow of the fluid in the second position; wherein the volume flow control unit (23) has a turnable operating element (24) that is connected to the actuating button (7) via a positive connection (26) with respect to a circumferential direction (25), wherein the operating element (24) is connected to the valve unit (2) via a threaded sleeve (27) so that by turning the operating element (24), an actuating element (28) of the valve unit (2) is configured to be shifted along the axial direction (10, 16) in order to change a flow cross-section (29) between the inflow connection (4) and the outflow connection (5).

12. The valve (1) according to claim 1, wherein the pushbutton housing (6) has an opening (33) at one end (30), through which opening the actuating button (7) is configured to be actuated; wherein, in the starting position (8), the actuating button (7) is flush with the end (30) and, in the actuated position (19), projects at least 10 millimeters beyond the end (30) along the axial direction (10, 16).

* * * * *